3,457,312
AMINE OXIDES
Eugene J. Miller, Jr., Wheaton, and Ago Mais, Broadview, Ill., assignors, by mesne assignments, to Armour Industrial Chemical Company, a corporation of Delaware
No Drawing. Filed Oct. 24, 1965, Ser. No. 505,034
Int. Cl. C07c 87/02
U.S. Cl. 260—584    2 Claims

ABSTRACT OF THE DISCLOSURE

Alkoxylated amine oxides of secondary-alkyl and cycloalkyl amines are synthesized and are used as detergents.

---

This invention relates to novel amine oxides and more particularly to a novel class of alkoxylated amine oxides of secondary-alkyl and cycloalkylamines. Such oxides are particularly useful as detergents for dishwashing and shampooing, as surfactants, and as foam boosters.

Recently, a novel class of secondary-alkyl primary amines have been devised. These can be synthesized by a relatively simple technique with efficient and economical recovery of the catalyst so that commercially the process is quite attractive. It has been desired to utilize this technology in further chemical synthesis.

In accordance with such desires, an object of this invention is to provide novel alkoxylated amine oxides of said secondary-alkyl and cycloalkyl amines.

Another object is to provide novel methods for the manufacture of such oxides.

Still another object is to provide a novel class of compounds which have good surfactant activity.

A further object is to provide a novel class of compounds which are good detergents especially for dishwashing and for shampooing.

Other objects of the invention will in part be obvious and will in part appear hereinafter.

The invention accordingly comprises the several steps and the relation of one or more of such steps with respect to each of the others, and the compound possessing the features, properties, and the relation of elements, which are exemplified in the following detailed disclosure, and the scope of the invention will be indicated in the clams.

It has now been found that alkoxylated secondary-alkyl amines may be converted to the oxide by simply oxidizing them with a strong oxidizing agent under mild temperature conditions.

Among the alkoxylated amines that may be oxidized, those falling within the following formulas are operable:

FORMULA I

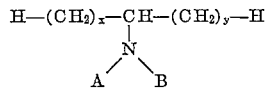

FORMULA II

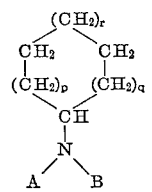

wherein

A and B are

E is selected from the group consisting of hydrogen and a methyl radical, $p$, $q$, and $r$ have a sum from 2 to 9, $x$ and $y$ are integers having a sum from 2 to 47.

The aryl, aliphatic and cycloaliphatic radicals of $R^1$ and $R^2$ may contain a carboxy substituent radical, such as found in oleic acid.

Among specific compounds falling within the above formula are the N,N-polyethoxylated and the N,N-polypropoxylated derivatives of the isomeric secondary-alkyl, and cycloalkyl amines having radicals such as butyl, pentyl, hexyl, heptyl, octyl, nonyl, decyl, hendecyl, dodecyl, tridecyl, tetradecyl, hexadecyl, octadecyl, nonadecyl, eicosyl, λ-carboxyheptadecyl, cyclohexyl and mixtures thereof, such as normally formed in the amidation of olefins. Typically, the $C_{6-7}$, $C_{7-9}$, $C_{9-10}$, $C_{9-11}$, $C_{11-14}$, $C_{11-15}$, $C_{15-18}$, $C_{15-20}$, and the $C_{20-48}$ fractions, as obtained in the preparation of secondary-alkyl primary amines from olefins with nitrile and water in a hydrogen fluoride medium, may be used.

The strong oxidizing agents that are useful comprise a relatively wide scope of compounds. Among such are hydrogen peroxide, perbenzoic acid and Caro's acid.

Usually between 2.0 and 20.0 molar equivalent percent in excess of the amine utilized is used, and the preferred excess amount is 5.0 molar equivalent percent.

Reference is now made to the following example which illustrates the synthesis of particular amine oxides:

EXAMPLE I

Bis-(2-hydroxyethyl)$C_{11-15}$ secondary-alkylamine oxide

A 250 ml. three neck flask equipped with a magnetic stirrer, thermometer, reflux condenser, and addition funnel is charged with 55 gms. (0.187 mole) of bis-(2-hydroxyethyl)$C_{11-15}$ secondary-alkylamine, 13.8 gms. of water and 42.0 gms. of isopropanol. Aqueous hydrogen peroxide (17.2 gms., 37.5%, 0.187 mole) is added to the stirred mixture in 30 minutes. The temperature will usually rise from about 25° C. to 60° C. The stirred mixture is then maintained at 40–55° C. for two hours. Analysis of the product at this point will show about 3.6% free amine remaining. An additional 0.4 ml. of hydrogen peroxide is then added to the reaction mixture. Analysis of the final product after two additional hours of stirring will approximate the following:

Analysis:                                    Percent
    Amine oxide _____ 38.9
    Free amine _____ 2.35
    Free peroxide _____ 0.12

It should be evident from the above disclosure and example that the alkoxylated amine oxides that may be formed by the method of this invention are those which fall within the following formulas:

FORMULA III

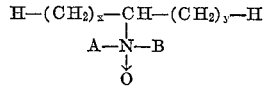

FORMULA IV

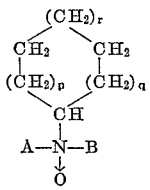

wherein

A and B =

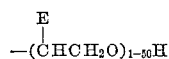

E is selected from the group consisting of hydrogen and a methyl radical, $p$, $q$, and $r$ have a sum from 2 to 9, $x$ and $y$ are integers having a sum from 2 to 47.

Among compounds which fall within the above formulas are

N,N-di(polyethoxylated[2 to 100 moles])-secondary-butylamine oxide,
N,N-di(polyethoxylated[2 to 100 moles])-secondary-pentylamine oxide,
N,N-di(polyethoxylated[2 to 100 moles])-secondary-hexylamine oxide,
N,N-di(polyethoxylated[2 to 100 moles])-secondary-heptylamine oxide,
N,N-di(polyethoxylated[2 to 100 moles])-secondary-octylamine oxide,
N,N-di(polyethoxylated[2 to 100 moles])-secondary-nonylamine oxide,
N,N-di(polyethoxylated[2 to 100 moles])-secondary-decylamine oxide,
N,N-di(polyethoxylated[2 to 100 moles])-secondary-hendecylamine oxide,
N,N-di(polyethoxylated[2 to 100 moles])-secondary-dodecylamine oxide,
N,N-di(polyethoxylated[2 to 100 moles])-secondary-tridecylamine oxide,
N,N-di(polyethoxylated[2 to 100 moles])-secondary-tetradecylamine oxide,
N,N-di(polyethoxylated[2 to 100 moles])-secondary-hexadecylamine oxide,
N,N-di(polyethoxylated[2 to 100 moles])-secondary-octadecylamine oxide,
N,N-di(polyethoxylated[2 to 100 moles])-secondary-nonadecylamine oxide,
N,N-di(polyethoxylated[2 to 100 moles])-secondary-eicosylamine oxide,
N, N-di(polyethoxylated[2 to 100 moles])amino-stearic acid oxide,
N,N-di(polyethoxylated[2 to 100 moles])cyclohexylamine dioxide,
N,N-di(polypropoxylated[2 to 100 moles])-secondary-butylamine oxide,
N,N-di(polypropoxylated[2 to 100 moles])-secondary-pentylamine oxide,
N,N-di(polypropoxylated[2 to 100 moles])-secondary-hexylamine oxide,
N,N-di(polypropoxylated[2 to 100 moles])-secondary-heptylamine oxide,
N,N-di(polypropoxylated[2 to 100 moles])-secondary-octylamine oxide,
N,N-di(polypropoxylated[2 to 100 moles])-secondary-nonylamine oxide,
N,N-di(polypropoxylated[2 to 100 moles])-secondary-decylamine oxide,
N,N-di(polypropoxylated[2 to 100 moles])-secondary-hendecylamine oxide,
N,N-di(polypropoxylated[2 to 100 moles])-secondary-dodecylamine oxide,
N,N-di(polypropoxylated[2 to 100 moles])-secondary-tridecylamine oxide,
N,N-di(polypropoxylated[2 to 100 moles])-secondary-tetradecylamine oxide,
N,N-di(polypropoxylated[2 to 100 moles])-secondary-hexadecylamine oxide,
N,N-di(polypropoxylated[2 to 100 moles])-secondary-octadecylamine oxide,
N,N-di(polypropoxylated[2 to 100 moles])-secondary-nonadecylamine oxide,
N,N-di(polypropoxylated[2 to 100 moles])-secondary-eicosylamine oxide,
N,N-di(propropoxylated[2 to 100 moles])aminostearic acid oxide, including the ethoxylated and propoxylated mixtures. The amine used may also be mixtures such as the $C_{6-7}$, $C_{7-9}$, $C_{9-10}$, $C_{9-11}$, $C_{11-14}$, $C_{11-15}$, $C_{15-18}$, $C_{15-20}$, $C_{18-20}$, and the $C_{20-48}$ isomeric fractions which are obtained when mixtures of secondary-alkyl primary amines are used as the starting reactants.

The above compounds are useful as surfactants especially in dishwashing and in shampooing compositions.

What is claimed is:

1. The alkoxylated aliphatic and cycloaliphatic amine oxides falling within the following formulas:

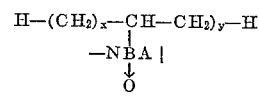

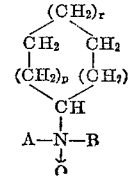

wherein

A and B =

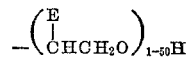

E is selected from the group consisting of hydrogen and a methyl radical, $p$, $q$, and $r$ has a sum from 2 to 9, $x$ and $y$ are integers having a sum from 2 to 47.

2. Bis-(polyalkoxylated[1 to 50 moles]) $C_{11-15}$ secondary-alkylamine oxide.

References Cited

UNITED STATES PATENTS

| 2,169,976 | 8/1939 | Guenther et al. | 260—563 X |
| 3,098,794 | 7/1963 | Dohr et al. | |
| 3,239,535 | 3/1966 | Searles. | |
| 3,270,060 | 8/1966 | Wakeman et al. | |
| 3,324,183 | 6/1967 | Priestly | 260—584 |

OTHER REFERENCES

Ishidate et al., "Nitrogen Mustard N-Oxides as Tumor-Growth Retarding Agents," the paper read at the scientific section of the 15th General Assembly of the International Pharmaceutical Federation on Sept. 17, 1953, held at Paris, France.

CHARLES B. PARKER, Primary Examiner

R. L. RAYMOND, Assistant Examiner

U.S. Cl. X.R.

252—152; 260—563, 583